US012198704B2

(12) United States Patent
Yamamoto et al.

(10) Patent No.: US 12,198,704 B2
(45) Date of Patent: Jan. 14, 2025

(54) INFORMATION PROCESSING DEVICE AND METHOD, AND PROGRAM

(71) Applicant: Sony Group Corporation, Tokyo (JP)

(72) Inventors: Yuki Yamamoto, Tokyo (JP); Toru Chinen, Kanagawa (JP); Minoru Tsuji, Chiba (JP); Yoshiaki Oikawa, Kanagawa (JP)

(73) Assignee: Sony Group Corporation, Tokyo (JP)

( * ) Notice: Subject to any disclaimer, the term of this patent is extended or adjusted under 35 U.S.C. 154(b) by 509 days.

(21) Appl. No.: 17/293,904

(22) PCT Filed: Nov. 6, 2019

(86) PCT No.: PCT/JP2019/043360
§ 371 (c)(1),
(2) Date: May 13, 2021

(87) PCT Pub. No.: WO2020/105423
PCT Pub. Date: May 28, 2020

(65) Prior Publication Data

US 2022/0020381 A1 Jan. 20, 2022

(30) Foreign Application Priority Data

Nov. 20, 2018 (JP) ................................ 2018-217180

(51) Int. Cl.
*G10L 19/008* (2013.01)

(52) U.S. Cl.
CPC .................................. *G10L 19/008* (2013.01)

(58) Field of Classification Search
CPC ........................... G10L 19/008; H04S 2420/03
See application file for complete search history.

(56) References Cited

U.S. PATENT DOCUMENTS 5,883,976 A 3/1999 Ohsawa
10,249,311 B2 * 4/2019 Adami .................. G10L 19/028
(Continued)

FOREIGN PATENT DOCUMENTS

CN 101542595 A 9/2009
CN 105229733 A 1/2016
(Continued)

OTHER PUBLICATIONS

International Search Report and English translation thereof mailed Jan. 28, 2020 in connection with International Application No. PCT/JP2019/043360.
(Continued)

*Primary Examiner* — Daniel C Washburn
*Assistant Examiner* — Athar N Pasha
(74) *Attorney, Agent, or Firm* — Wolf, Greenfield & Sacks, P.C.

(57) ABSTRACT

The present technology relates to an information processing device and method and a program that make it possible to reduce the total number of objects while the influence on the sound quality is suppressed.
The information processing device includes a pass-through object selection unit configured to acquire data of L objects and select, from the L objects, M pass-through objects whose data is to be outputted as it is, and an object generation unit configured to generate, on the basis of the data of multiple non-pass-through objects that are not the pass-through objects among the L objects, the data of N new objects, N being smaller than (L−M). The present technology can be applied to an information processing device.

18 Claims, 7 Drawing Sheets

(56) References Cited

U.S. PATENT DOCUMENTS

| | | | | |
|---|---|---|---|---|
| 2004/0083258 | A1 * | 4/2004 | Haneda | G10L 19/24 704/E19.044 |
| 2012/0230497 | A1 * | 9/2012 | Dressler | G10L 19/008 381/22 |
| 2014/0023196 | A1 * | 1/2014 | Xiang | H04S 7/30 381/17 |
| 2015/0142453 | A1 | 5/2015 | Oomen et al. | |
| 2016/0104496 | A1 | 4/2016 | Purnhagen et al. | |
| 2016/0125887 | A1 | 5/2016 | Purnhagen et al. | |
| 2016/0225377 | A1 | 8/2016 | Miyasaka et al. | |
| 2016/0300577 | A1 * | 10/2016 | Fersch | H04R 3/12 |
| 2017/0323647 | A1 | 11/2017 | Murtaza et al. | |
| 2017/0374484 | A1 | 12/2017 | Lando et al. | |
| 2018/0033440 | A1 * | 2/2018 | Chinen | H03M 7/30 |
| 2018/0152802 | A1 | 5/2018 | Briand | |
| 2018/0295464 | A1 | 10/2018 | Breebaart et al. | |

FOREIGN PATENT DOCUMENTS

| | | | |
|---|---|---|---|
| CN | 107925837 | A | 4/2018 |
| JP | 2016-522911 | A | 8/2016 |
| JP | 2016-525699 | A | 8/2016 |
| JP | 2018-510532 | A | 4/2018 |
| WO | WO 2015/056383 | A1 | 4/2015 |
| WO | WO 2018/047667 | A1 | 3/2018 |

OTHER PUBLICATIONS

Written Opinion and English translation thereof mailed Jan. 28, 2020 in connection with International Application No. PCT/JP2019/043360.

International Preliminary Report on Patentability and English translation thereof mailed Jun. 3, 2021 in connection with International Application No. PCT/JP2019/043360.

Extended European Search Report issued Dec. 15, 2021 in connection with European Application No. 19886482.9.

[No Author Listed], Information technology—High efficiency coding and media delivery in heterogeneous environments—Part 3: 3D audio. ISO/IEC 23008-3. Feb. 2016. 439 pages.

[No Author Listed], Information technology—High efficiency coding and media delivery in heterogeneous environments—Part 3: 3D audio. Amendment 3: MPEG-H 3D Audio Phase 2. ISO/IEC 23008-3. Jan. 2017. 456 pages.

* cited by examiner

INFORMATION PROCESSING DEVICE AND METHOD, AND PROGRAM

CROSS-REFERENCE TO RELATED APPLICATIONS

This application claims the benefit under 35 U.S.C. § 371 as a U.S. National Stage Entry of International Application No. PCT/JP2019/043360, filed in the Japanese Patent Office as a Receiving Office on Nov. 6, 2019, which claims priority to Japanese Patent Application Number JP2018-217180, filed in the Japanese Patent Office on Nov. 20, 2018, each of which is hereby incorporated by reference in its entirety.

TECHNICAL FIELD

The present technology relates to an information processing device and method and a program, and particularly to an information processing device and method and a program that make it possible to reduce the total number of objects while the influence on the sound quality is suppressed.

BACKGROUND ART

Conventionally, the MPEG (Moving Picture Experts Group)-H 3D Audio standard is known (for example, refer to NPL 1 and NPL 2).

According to the 3D Audio supported by the MPEG-H 3D Audio standard or the like, it is possible to reproduce a direction, a distance, a spread of sound, and so forth of three-dimensional sound and to achieve audio reproduction that increases the immersive of audio in comparison with conventional stereo reproduction.

CITATION LIST

Non Patent Literature

[NPL 1]
ISO/IEC 23008-3, MPEG-H 3D Audio
[NPL 2]
ISO/IEC 23008-3: 2015/AMENDMENT3, MPEG-H 3D Audio Phase 2

SUMMARY

Technical Problems

However, according to the 3D Audio, in the case where the number of objects included in content becomes great, the data size of the overall content becomes great, and the calculation amount in decoding processing, rendering processing, and so forth of data of the plurality of objects also becomes great. Further, for example, in the case where an upper limit of the number of objects is determined by operation or the like, content that includes a number of objects exceeding the upper limit cannot be handled in the operation or the like.

Therefore, it is conceivable to reduce the total number of objects by discarding some of the objects included in content. However, in such a case, there is a possibility that the quality of sound of the entire content may be degraded by discarding the objects.

The present technology has been made in view of such a situation as described above and makes it possible to reduce the total number of objects while the influence on the sound quality is suppressed.

Solution to Problems

An information processing device according to one aspect of the present technology includes a pass-through object selection unit configured to acquire data of L objects and select, from the L objects, M pass-through objects whose data is to be outputted as it is, and an object generation unit configured to generate, on the basis of the data of multiple non-pass-through objects that are not the pass-through objects among the L objects, the data of N new objects, N being smaller than (L−M).

An information processing method or a program according to one aspect of the present technology includes the steps of acquiring data of L objects, selecting, from the L objects, M pass-through objects whose data is to be outputted as it is, and generating, on the basis of the data of multiple non-pass-through objects that are not the pass-through objects among the L objects, the data of N new objects, N being smaller than (L−M).

In the one aspect of the present technology, the data of the L objects is acquired, and the M pass-through objects whose data is to be outputted as it is, is selected from the L objects. Then, on the basis of the data of the multiple non-pass-through objects that are not the pass-through objects among the L objects, the data of the N new objects is generated, N being smaller than (L−M).

DESCRIPTION OF EMBODIMENTS

Figure 1:
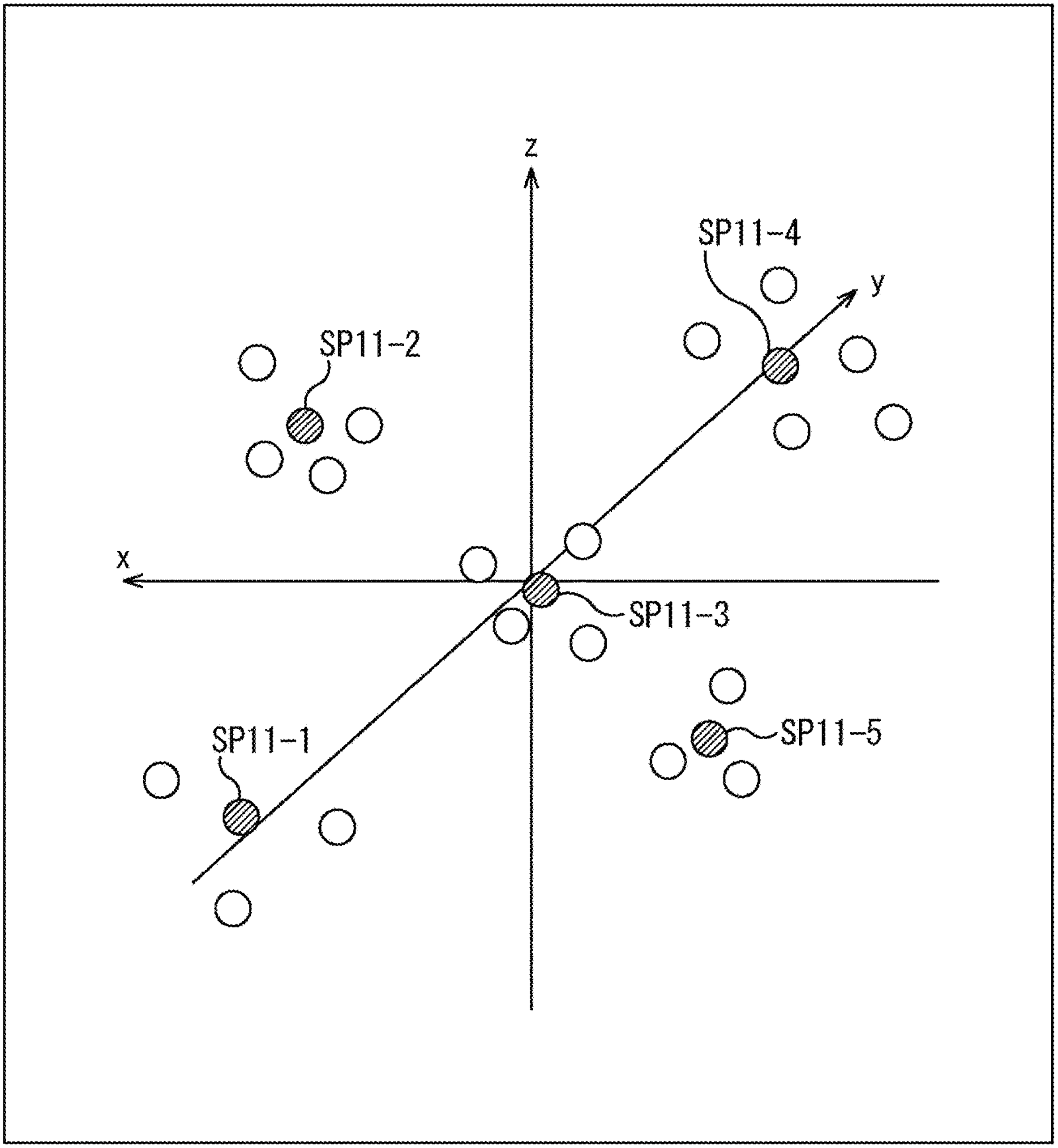
FIG. 1 is a view illustrating determination of a position of a virtual speaker.

In the following, embodiments to which the present technology is applied are described with reference to the drawings.

First Embodiment

Present Technology

The present technology sorts a plurality of objects into pass-through objects and non-pass-through objects and generates new objects on the basis of non-pass-through objects to make it possible to reduce the total number of the objects while the influence on the sound quality is suppressed.

It is to be noted that, in the present technology, an object may be anything as long as it has object data, such as an audio object or an image object.

The object data here signifies, for example, an object signal and metadata of the object.

In particular, for example, if the object is an audio object, data of the audio object includes metadata and an audio signal as an object signal, and if the object is an image object, data of the image object includes metadata and an image signal as an object signal.

The following description is given while taking a case in which the object is an audio object, as an example.

In the case where the object is an audio object, an audio signal and metadata of the object are handled as the data of the object.

Here, the metadata includes, for example, position information indicative of a position of an object in a three-dimensional space, priority information indicative of a priority degree of the object, gain information of an audio signal of the object, spread information indicative of a spread of a sound image of sound of the object, and so forth.

Further, the position information of the object includes, for example, a radius indicative of a distance from a position determined as a reference to the object, a horizontal angle indicative of a position of the object in a horizontal direction, and a vertical angle indicative of a position of the object in a vertical direction.

The present technology can be applied, for example, to a pre-rendering processing device that receives a plurality of objects included in content, more particularly, receives data of the objects, as an input thereto and outputs an appropriate number of objects according to the input, more particularly, outputs data of the objects.

In the following, the number of objects at the time of inputting is represented by nobj_in, and the number of objects at the time of outputting is represented by nobj_out. In particular, nobj_out<nobj_in is satisfied here. That is, the number of objects to be outputted is made smaller than the number of objects to be inputted.

In the present technology, some of nobj_in objects that have been inputted are determined as objects whose data is to be outputted as it is without being changed at all, that is, as objects that are to pass through. In the following description, such an object that is to pass through is referred to as a pass-through object.

Further, objects that are not determined as pass-through objects among the nobj_in inputted objects are determined as non-pass-through objects that are not the pass-through objects. In the present technology, data of non-pass-through objects is used for generation of data of new objects.

In such a manner, if nobj_in objects are inputted, the objects are sorted into pass-through objects and non-pass-through objects.

Then, on the basis of the objects determined as non-pass-through objects, a number of new objects less than the total number of the non-pass-through objects are generated, and data of the generated new objects and data of the pass-through objects are outputted.

By this, according to the present technology, nobj_out objects less than nobj_in inputs are outputted, and reduction of the total number of objects is implemented.

In the following, the number of objects to be determined as pass-through objects is assumed to be nobj_dynamic. For example, it is assumed that the number of pass-through objects, that is, nobj_dynamic, can be set by a user or the like within such a range as to satisfy a condition indicated by the following expression (1).

[Math. 1]

$$0 \leq nobj\_dynamic < nobj\_out < nobj\_in \quad (1)$$

According to the condition indicated by the expression (1), nobj_dynamic, which is the number of pass-through objects, is equal to or greater than 0 but smaller than nobj_out.

For example, nobj_dynamic, which is the number of pass-through objects, can be determined in advance or designated by an inputting operation of a user or the like. However, nobj_dynamic, which is the number of pass-through objects, may also be determined dynamically such that nobj_dynamic becomes equal to or smaller than a maximum number determined in advance, on the basis of the data amount (data size) of the entire content, the calculation amount of processing upon decoding, and so forth. In such a case, the maximum number determined in advance is smaller than nobj_out.

It is to be noted that the data amount of the entire content is a total data amount (data size) of metadata and audio signals of pass-through objects and metadata and audio signals of objects to be generated newly. Further, the calculation amount of processing upon decoding that is to be taken into consideration at the time of determination of nobj_dynamic may be only a calculation amount of decoding processing of encoded data (metadata and audio signal) of the objects or may be a total of a calculation amount of decoding processing and a calculation amount of rendering processing.

In addition, not only nobj_dynamic, which is the number of pass-through objects, but also nobj_out, which is the number of objects to be outputted finally, may be determined on the basis of the data amount of the entire content or the calculation amount of processing upon decoding, or nobj_out may be designated by the user or the like. Further, nobj_out may otherwise be determined in advance.

Here, a particular example of a selection method of pass-through objects is described.

First, in the following description, ifrm is used as an index indicative of a time frame of an audio signal, and iobj is used as an index indicative of an object. It is to be noted that, in the following description, a time frame whose index is ifrm is referred to as a time frame ifrm, and an object whose index is iobj is referred to as an object iobj.

Further, priority information is included in metadata of each object, and priority information included in metadata of an object iobj in a time frame ifrm is represented as priority_raw[ifrm][iobj]. In particular, it is assumed that metadata provided in advance to an object includes priority information priority_raw[ifrm][iobj].

In such a case, for example, in the present technology, a value of the priority information priority[ifrm][iobj] of each object that is indicated by the following expression (2) is calculated for each time frame.

[Math. 2]

$$priority[ifrm][iobj] = priority\_raw[ifrm][iobj] + weight \times priority\_gen[ifrm][iobj] \quad (2)$$

It is to be noted that, in the expression (2), priority_gen[ifrm][iobj] is priority information of the object iobj in the time frame ifrm that is calculated on the basis of information other than priority_raw[ifrm][iobj].

For example, for calculation of the priority information priority_gen[ifrm][iobj], not only gain information, position information, and spread information that are included in metadata, but also an audio signal of an object and so forth can be used solely or in any combination. Further, not only gain information, position information, spread information, and an audio signal in a current time frame but also gain information, position information, spread information, and an audio signal in a time frame preceding in time, such as a time frame immediately before the current time frame, may be used to calculate the priority information priority_gen[ifrm][iobj] in the current time frame.

As a particular method for calculation of the priority information priority_gen[ifrm][iobj], it is sufficient to use the method described, for example, in PCT Patent Publication No. WO2018/198789.

In particular, it is possible to use, as the priority information priority_gen[ifrm][iobj], a reciprocal of a radius that configures position information included in metadata, such that, for example, a higher priority is set to an object nearer the user. As an alternative, as the priority information priority_gen[ifrm][iobj], a reciprocal of an absolute value of a horizontal angle that configures position information included in metadata can be used such that, for example, a higher priority is set to an object positioned nearer the front of the user.

As another alternative, the moving speed of an object may be used as the priority information priority_gen[ifrm][iobj], on the basis of position information included in metadata in time frames different from each other. As a further alternative, gain information itself included in metadata may be used as the priority information priority_gen[ifrm][iobj].

As a still further alternative, for example, a square value or the like of spread information included in metadata may be used as the priority information priority_gen[ifrm][iobj], or the priority information priority_gen[ifrm][iobj] may be calculated on the basis of attribute information of an object.

Further, in the expression (2), weight is a parameter that determines a ratio between the priority information priority_raw[ifrm][iobj] and the priority information priority_gen[ifrm][iobj] in calculation of the priority information priority[ifrm][iobj], and is set, for example, to 0.5.

It is to be noted that, in the MPEG-H 3D Audio standard, the priority information priority_raw[ifrm][iobj] is not applied to an object in some cases, and therefore, in such a case, it is sufficient if the value of the priority information priority_raw[ifrm][iobj] is set to 0 to perform calculation of the expression (2).

After the priority information priority[ifrm][iobj] of each object is calculated according to the expression (2), the priority information priority[ifrm][iobj] of the respective objects is sorted in the descending order of the value, for each time frame ifrm. Then, nobj_dynamic upper objects having a comparatively high value of the priority information priority[ifrm][iobj] are selected as pass-through objects in the time frame ifrm while the remaining objects are determined as non-pass-through objects.

In other words, by selecting nobj_dynamic objects in the descending order of the priority information priority[ifrm][iobj], nobj_in objects are sorted into nobj_dynamic pass-through objects and (nobj_in−nobj_dynamic) non-pass-through objects.

After the sorting is performed, in regard to the nobj_dynamic pass-through objects, metadata and audio signals of the pass-through objects are outputted as they are, to a succeeding stage.

On the other hand, in regard to the (nobj_in−nobj_dynamic) non-pass-through objects, rendering processing, namely, pre-rendering processing, is performed on the non-pass-through objects. Consequently, metadata and audio signals of (nobj_out−nobj_dynamic) new objects are generated.

In particular, for example, in regard to each non-pass-through object, rendering processing by VBAP (Vector Base Amplitude Panning) is performed, and the non-pass-through objects are rendered to (nobj_out−nobj_dynamic) virtual speakers. Here, the virtual speakers correspond to the new objects, and the arrangement positions of the virtual speakers in a three-dimensional space are arranged so as to be different from one another.

For example, it is assumed that spk is an index indicative of a virtual speaker and that a virtual speaker indicated by the index spk is represented as a virtual speaker spk. Further, it is assumed that an audio signal of a non-pass-through object whose index is iobj in a time frame ifrm is represented as sig[ifrm][iobj].

In such a case, in regard to each non-pass-through object iobj, VBAP is performed on the basis of position information included in metadata and the position of a virtual speaker in the three-dimensional space. Consequently, for each non-pass-through object iobj, a gain gain[ifrm][iobj][spk] of each of the (nobj_out−nobj_dynamic) virtual speakers spk is obtained.

Then, for each virtual speaker spk, the sum of the audio signals sig[ifrm][iobj] of the respective non-pass-through objects iobj that are multiplied by the gains gain[ifrm][iobj][spk] of the virtual speakers spk is calculated, and an audio signal obtained as a result of the calculation is used as an audio signal of a new object corresponding to the virtual speaker spk.

For example, the position of a virtual speaker corresponding to a new object is determined by the k-means method. In particular, position information included in metadata of non-pass-through objects is divided into (nobj_out−nobj_dynamic) clusters for each time frame by the k-means method, and the position of the center of each cluster is determined as the position of a virtual speaker.

Accordingly, in the case where nobj_in=24, nobj_dynamic=5, and nobj_out=10, the position of a virtual speaker is determined, for example, in such a manner as depicted in FIG. 1. In such a case, the position of the virtual speaker may change depending upon the time frame.

In FIG. 1, a circle not indicated by hatches (slanting lines) represents a non-pass-through object, and such non-pass-through objects are arranged at positions indicated by position information included in metadata in a three-dimensional space.

In the example, such sorting as described above is performed for each time frame, and nobj_dynamic (=5) pass-through objects are selected while the (nobj_in−nobj_dynamic (=24−5=19)) remaining objects are determined as non-pass-through objects.

Here, since the number of the virtual speakers, that is, (nobj_out−nobj_dynamic), is 10−5=5, the position information of the 19 non-pass-through objects is divided into five clusters, and the positions of the centers of the respective clusters are determined as the positions of virtual speakers SP11-1 to SP11-5.

In FIG. 1, the virtual speakers SP11-1 to SP11-5 are arranged at the positions of the centers of the clusters corresponding to the virtual speakers. It is to be noted that, in the case where there is no necessity to specifically distinguish the virtual speakers SP11-1 to SP11-5 from one another, each of them is referred to merely as virtual speaker SP11 in some cases.

In the rendering processing, the 19 non-pass-through objects are rendered to the five virtual speakers SP11 obtained in such a manner.

It is to be noted that, while an audio signal of a new object corresponding to the virtual speaker SP11 is determined by the rendering processing, position information included in metadata of the new object is information indicative of the position of the virtual speaker SP11 corresponding to the new object.

Further, information included in the metadata of the new object other than the position information, such as priority information, gain information, and spread information, is an average value, a maximum value, or the like of information of metadata of non-pass-through objects included in a cluster corresponding to the new object. In other words, for example, an average value or a maximum value of the gain information of the non-pass-through objects belonging to the cluster is determined as gain information included in the metadata of the new object corresponding to the cluster.

After audio signals and metadata of (nobj_out−nobj_dynamic=5) new objects are generated in such a manner as described above, the audio signals and metadata of the new objects are outputted to a succeeding stage.

As a result, in the example, audio signals and metadata of (nobj_dynamic=5) pass-through objects and audio signals and metadata of (nobj_out−nobj_dynamic=5) new objects are thus outputted to the succeeding stage.

In other words, audio signals and metadata of (nobj_out=10) objects are outputted in total.

In such a way, nobj_out objects less than nobj_in inputted objects are outputted, so that the total number of objects can be reduced.

Consequently, the data size of the entire content including a plurality of objects can be reduced, and the calculation amount of decoding processing and rendering processing for the objects at the succeeding stage can also be reduced. Further, even in the case where nobj_in, that is, the number of objects of the input, exceeds the number of objects that is determined by operation or the like, since the number of outputs can be made equal to the number of the objects that is determined by operation or the like, it becomes possible to handle content including outputted object data by operation or the like.

In addition, according to the present technology, an object having high priority information priority[ifrm][iobj] is used as a pass-through object, and an audio signal and metadata of the object are outputted as they are, so that degradation of the sound quality of sound of the content does not occur in the pass-through object.

Further, in regard to non-pass-through objects, since new objects are generated on the basis of the non-pass-through objects, the influence on the sound quality of sound of the content can be minimized. In particular, if new objects are generated by using non-pass-through objects, components of sound of all objects are included in the sound of the content.

Accordingly, in comparison with a case in which, for example, a number of objects that can be handled are left while the other objects are discarded, the influence on the sound quality of sound of content can be suppressed.

According to the present technology, the total number of objects can be suppressed while the influence on the sound quality is suppressed in such a manner as described above.

It is to be noted that, while the foregoing description is directed to an example in which the position of a virtual speaker is determined by the k-means method, the position of a virtual speaker may be determined in any way.

For example, grouping (clustering) of non-pass-through objects may be performed by a method other than the k-means method according to a degree of concentration of non-pass-through objects in a three-dimensional space, and the position of the center of each group, an average position of the positions of non-pass-through objects belonging to a group, or the like may be determined as the position of a virtual speaker. It is to be noted that the degree of concentration of objects in a three-dimensional space indicates the degree to which objects arranged in a three-dimensional space are concentrated (crowded).

Further, according to the degree of concentration of non-pass-through objects, the number of groups upon grouping may be determined so as to be a predetermined number which is less than (nobj_in−nobj_dynamic).

Otherwise, even in the case where the k-means method is used, the number of objects to be generated newly may be determined such that it is equal to or smaller than a maximum number determined in advance, according to a degree of concentration of positions of non-pass-through objects, a number designation operation by the user, a data amount (data size) of the entire content, or a calculation amount of processing upon decoding. In such a case, it is sufficient if the number of objects to be generated newly is smaller than (nobj_in−nobj_dynamic), and thus, the condition of the expression (1) described hereinabove is satisfied.

Further, the position of a virtual speaker may be a fixed position determined in advance. In such a case, for example, if the position of each virtual speaker is set to an arrangement position of each speaker in speaker arrangement of 22 channels, handling of a new object is facilitated at a succeeding stage. Otherwise, the positions of several virtual speakers among a plurality of virtual speakers may be fixed positions determined in advance while the positions of the remaining virtual speakers are determined by the k-means method or the like.

Further, while an example in which all of objects that are not determined as pass-through objects are used as non-pass-through objects is described here, some objects may be discarded without being used as either pass-through objects or non-pass-through objects. In such a case, a predetermined number of lower objects having a lower value of the priority information priority[ifrm][iobj] may be discarded, or objects having a value of the priority information priority[ifrm][iobj] that is equal to or lower than a predetermined threshold value may be discarded.

For example, in the case where content including a plurality of objects is sound of a movie or the like, some of the objects have such a low significance that, even if they are discarded, this has little influence on the sound quality of sound of the content obtained finally. Accordingly, in such a case, even if only part of the objects that are not determined as pass-through objects are used as non-pass-through objects, this has little influence on the quality of sound.

In contrast, for example, in the case where content including a plurality of objects is music or the like, since an object having a low significance is not included in most cases, it is important to use, as non-pass-through objects, all objects that are not determined as pass-through objects in order to suppress the influence on the sound quality.

While the foregoing description is directed to an example in which a pass-through object is selected on the basis of priority information, a pass-through object may otherwise be selected on the basis of a degree of concentration (degree of crowdedness) of objects in a three-dimensional space.

In such a case, for example, grouping of objects is performed on the basis of position information included in metadata of the respective objects. Then, sorting of the objects is performed on the basis of a result of the grouping.

In particular, for example, it is possible to determine, as a pass-through object, an object whose distance from any other object is equal to or greater than a predetermined value, and determine, as a non-pass-through object, an object whose distance from the other objects is smaller than the predetermined value.

Further, in the case where clustering (grouping) is performed by the k-means method or the like on the basis of position information included in metadata of respective objects and where only one object belongs to a cluster, the object belonging to the cluster may be determined as a pass-through object.

In such a case, in regard to a cluster to which a plurality of objects belongs, all of the objects belonging to the cluster may be determined as non-pass-through objects, or an object whose priority degree indicated by priority information is highest among the objects belonging to the cluster may be determined as a pass-through object while the remaining objects are determined as non-pass-through objects.

In the case where a pass-through object is selected depending upon a degree of concentration or the like in such a manner, nobj_dynamic, which is the number of pass-through objects, may also be determined dynamically according to a result of grouping or clustering, a data amount (data size) of the entire content, a calculation amount of processing upon decoding, or the like.

Further, in addition to generation of a new object by rendering processing by VBAP or the like, an average value, a linear coupling value, or the like of audio signals of non-pass-through objects may be used as an audio signal of a new object. The method of generating a new object by using an average value or the like is useful especially in such a case that only one object is to be generated newly.

<Example of Configuration of Pre-Rendering Processing Device>

Next, a pre-rendering processing device to which the present technology described above is applied is described. Such a pre-rendering processing device as described above is configured, for example, in such a manner as depicted in FIG. 2.

Figure 2:
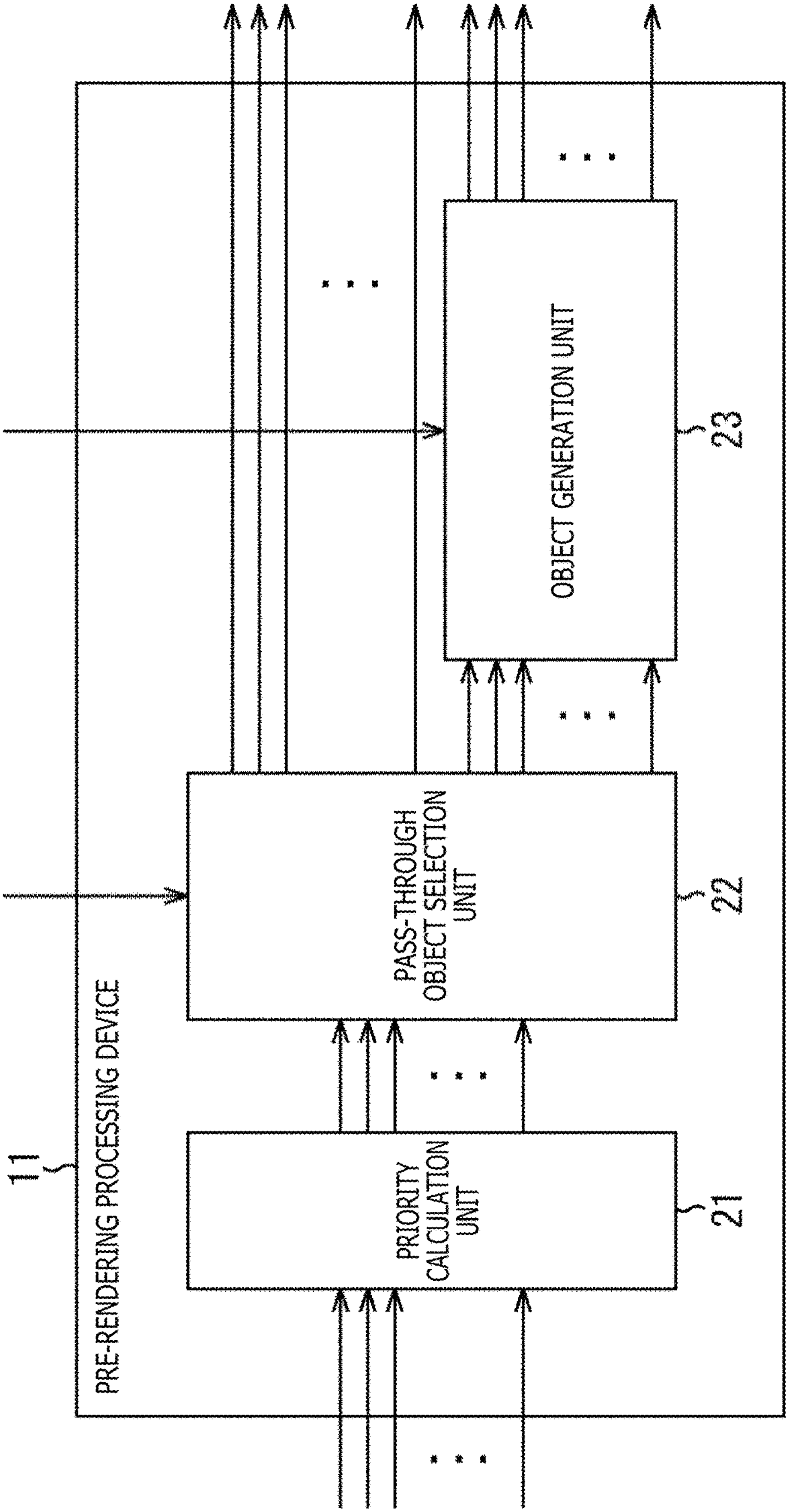
FIG. 2 is a view depicting an example of a configuration of a pre-rendering processing device.

A pre-rendering processing device 11 depicted in FIG. 2 is an information processing device that receives data of a plurality of objects as an input thereto and that outputs data of a number of objects less than the input. The pre-rendering processing device 11 includes a priority calculation unit 21, a pass-through object selection unit 22, and an object generation unit 23.

In the pre-rendering processing device 11, data of nobj_in objects, that is, metadata and audio signals of the objects, are supplied to the priority calculation unit 21.

Further, number information indicative of nobj_in, nobj_out, and nobj_dynamic, which are respectively the number of objects of the input, the number of objects of the output, and the number of pass-through objects, is supplied to the pass-through object selection unit 22 and the object generation unit 23.

The priority calculation unit 21 calculates priority information priority[ifrm][iobj] of each object, on the basis of the supplied metadata and audio signal of each object, and supplies the priority information priority[ifrm][iobj], metadata, and audio signal of each object to the pass-through object selection unit 22.

To the pass-through object selection unit 22, the metadata, audio signals, and priority information priority[ifrm][iobj] of the objects are supplied from the priority calculation unit 21, and number information is also supplied from the outside. In other words, the pass-through object selection unit 22 acquires the object data and the priority information priority[ifrm][iobj] from the priority calculation unit 21 and also acquires the number information from the outside.

The pass-through object selection unit 22 selects a pass-through object on the basis of the supplied number information and the priority information priority[ifrm][iobj] supplied from the priority calculation unit 21. The pass-through object selection unit 22 outputs the metadata and audio signals of the pass-through objects supplied from the priority calculation unit 21, to the succeeding stage as they are and supplies the metadata and audio signals of the non-pass-through objects supplied from the priority calculation unit 21, to the object generation unit 23.

The object generation unit 23 generates metadata and an audio signal of a new object on the basis the supplied number information and the metadata and audio signal of a non-pass-through object supplied from the pass-through object selection unit 22, and outputs the metadata and audio signal of the new object to the succeeding stage.

<Description of Object Outputting Process>

Next, operation of the pre-rendering processing device 11 is described. In particular, an object outputting process by the pre-rendering processing device 11 is described below with reference to a flow chart of FIG. 3.

In step S11, the priority calculation unit 21 calculates priority information priority[ifrm][iobj] of each object, on the basis of the supplied metadata and audio signal of each object in a predetermined time frame.

For example, the priority calculation unit 21 calculates priority information priority_gen[ifrm][iobj] for each object on the basis of the metadata and the audio signal, and performs calculation of the expression (2) on the basis of priority information priority_raw[ifrm][iobj] included in the metadata and the calculated priority information priority_gen[ifrm][iobj], thereby calculating priority information priority[ifrm][iobj].

The priority calculation unit 21 supplies the priority information priority[ifrm][iobj], metadata, and audio signal of each object to the pass-through object selection unit 22.

In step S12, the pass-through object selection unit 22 selects nobj_dynamic pass-through objects from the nobj_in objects on the basis of the supplied number information and the priority information priority[ifrm][iobj] supplied from the priority calculation unit 21. In other words, sorting of the objects is performed.

In particular, the pass-through object selection unit 22 performs sorting of the priority information priority[ifrm][iobj] of the respective objects to select nobj_dynamic upper objects having a comparatively high value of the priority information priority[ifrm][iobj], as pass-through objects. In such a case, although all of objects that are not determined as pass-through object among the nobj_in inputted objects are determined as non-pass-through objects, only part of objects that are not pass-through objects may be determined as non-pass-through objects.

In step S13, the pass-through object selection unit 22 outputs, to the succeeding stage, the metadata and audio signals of the pass-through objects selected by the processing in step S12 from the metadata and audio signals of the respective objects supplied from the priority calculation unit 21.

Further, the pass-through object selection unit 22 supplies the metadata and audio signal of the (nobj_in−nobj_dynamic) non-pass-through objects obtained by sorting of the objects, to the object generation unit 23.

It is to be noted that, while an example in which sorting of objects is performed on the basis of the priority information is described here, a pass-through object may also be selected on the basis of a degree of concentration of positions of objects or the like as described above.

In step S14, the object generation unit 23 determines positions of (nobj_out−nobj_dynamic) virtual speakers on the basis of the supplied number information and the metadata and audio signals of the non-pass-through objects supplied from the pass-through object selection unit 22.

For example, the object generation unit 23 performs clustering of the position information of the non-pass-through objects by the k-means method and determines the position of the center of each of (nobj_out−nobj_dynamic) clusters obtained as a result of the clustering, as a position of a virtual speaker corresponding to the cluster.

It is to be noted that the determination method of the position of a virtual speaker is not limited to the k-means method, and such position may be determined by other methods, or a fixed position determined in advance may be determined as the position of a virtual speaker.

In step S15, the object generation unit 23 performs rendering processing on the basis of the metadata and audio signals of the non-pass-through objects supplied from the pass-through object selection unit 22 and the positions of the virtual speakers obtained in step S14.

For example, the object generation unit 23 performs VBAP as the rendering processing to calculate a gain gain[ifrm][iobj][spk] of each virtual speaker. Further, for each virtual speaker, the object generation unit 23 calculates the sum of audio signals sig[ifrm][iobj] of the non-pass-through objects multiplied by the gains gain[ifrm][iobj][spk] and determines an audio signal obtained as a result of the calculation as an audio signal of a new object corresponding to the virtual speaker.

Further, the object generation unit 23 generates metadata of the new object on the basis of a result of clustering obtained upon determination of the position of the virtual speaker and the metadata of the non-pass-through objects.

Consequently, metadata and audio signals are obtained in regard to (nobj_out−nobj_dynamic) new objects. It is to be noted that, as the generation method of an audio signal of the new object, rendering processing other than the VBAP may also be performed, for example.

In step S16, the object generation unit 23 outputs the metadata and audio signals of the (nobj_out−nobj_dynamic) new objects obtained by the processing in step S15, to the succeeding stage.

Consequently, the metadata and audio signals of the nobj_dynamic pass-through objects and the metadata and audio signals of the (nobj_out−nobj_dynamic) new objects are outputted in one time frame.

In particular, the metadata and audio signals of the nobj_out objects are outputted in total as the metadata and audio signals of the object after the pre-rendering processing.

In step S17, the pre-rendering processing device 11 decides whether or not the process has been performed for all time frames.

In the case where it is decided in step S17 that the process has not been performed for all time frames, the processing returns to step S11 and the abovementioned process is performed repeatedly. In particular, the process is performed for a next time frame.

On the other hand, in the case where it is decided in step S17 that the process has been performed for all time frames, each of the units of the pre-rendering processing device 11 stops performing the processing, and the object outputting process ends.

In such a manner as described above, the pre-rendering processing device 11 performs sorting of objects on the basis of priority information. In regard to pass-through objects having a high priority degree, the pre-rendering processing device 11 outputs metadata and an audio signal as they are. In regard to non-pass-through objects, the pre-rendering processing device 11 performs rendering processing to generate metadata and an audio signal of a new object and then outputs the generated metadata and audio signal.

Accordingly, in regard to an object that has high priority information and has considerable influence on the sound quality of sound of content, metadata and an audio signal are outputted as they are, and in regard to the other objects, a new object is generated in rendering processing, and thus, the total number of objects is reduced while the influence on the sound quality is suppressed.

It is to be noted that, while the foregoing description is directed to an example in which sorting of objects is performed for each time frame, the same object may always be determined as a pass-through object irrespective of the time frame.

In such a case, for example, the priority calculation unit 21 obtains priority information priority[ifrm][iobj] of the object in all time frames and determines the sum of the priority information priority[ifrm][iobj] obtained in regard to all of the time frames, as priority information priority [iobj] of the object. Then, the priority calculation unit 21 sorts the priority information priority[iobj] of the respective objects and selects nobj_dynamic upper objects having a comparative high value of the priority information priority [iobj], as pass-through objects.

Sorting of objects may otherwise be performed for each interval including a plurality of successive time frames. In such a case, it is also sufficient if priority information of each object is obtained for each interval, similarly to the priority information priority[iobj].

Application Example 1 of Present Technology to Encoding Device

<Example of Configuration of Encoding Device>

Incidentally, the present technology described above can be applied to an encoding device having a 3D Audio encoding unit that performs 3D Audio encoding. Such an encoding device is configured, for example, in such a manner as depicted in FIG. 4.

Figure 4:
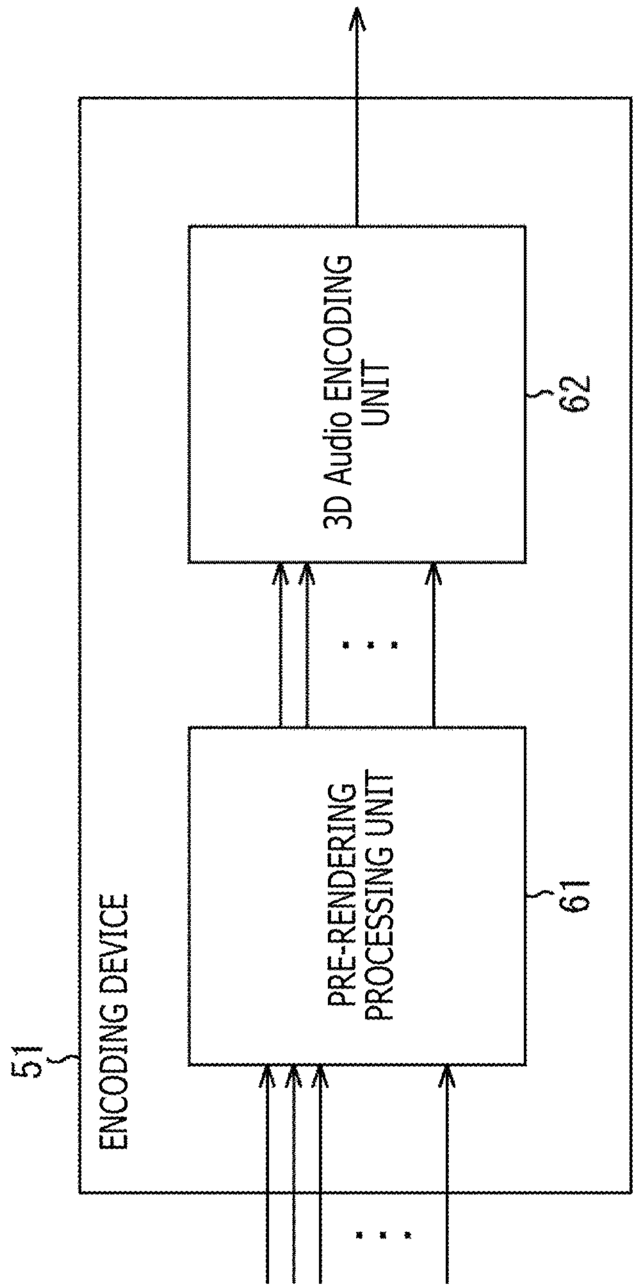
FIG. 4 is a view depicting an example of a configuration of an encoding device.

An encoding device 51 depicted in FIG. 4 includes a pre-rendering processing unit 61 and a 3D Audio encoding unit 62.

The pre-rendering processing unit 61 corresponds to the pre-rendering processing device 11 depicted in FIG. 2 and has a configuration similar to that of the pre-rendering processing device 11. In particular, the pre-rendering processing unit 61 includes the priority calculation unit 21, pass-through object selection unit 22, and object generation unit 23 described hereinabove.

To the pre-rendering processing unit 61, metadata and audio signals of a plurality of objects are supplied. The pre-rendering processing unit 61 performs pre-rendering processing to reduce the total number of objects and supplies the metadata and audio signals of the respective objects after the reduction, to the 3D Audio encoding unit 62.

The 3D Audio encoding unit 62 encodes the metadata and audio signals of the objects supplied from the pre-rendering processing unit 61 and outputs a 3D Audio code string obtained as a result of the encoding.

For example, it is assumed that metadata and audio signals of nobj_in objects are supplied to the pre-rendering processing unit 61.

Figure 3:
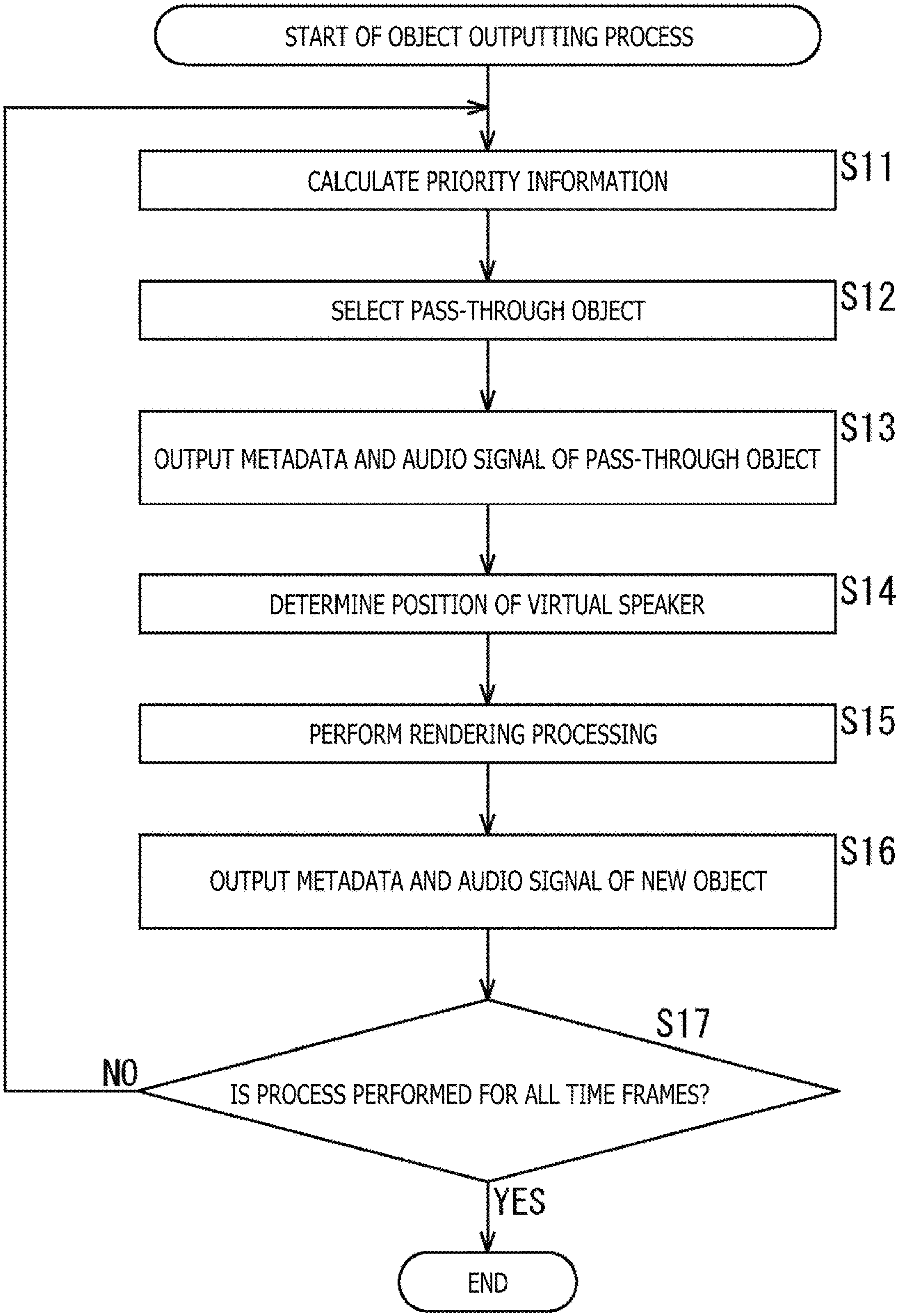
FIG. 3 is a flow chart illustrating an object outputting process.

In such a case, the pre-rendering processing unit 61 performs a process similar to the object outputting process described hereinabove with reference to FIG. 3 and supplies metadata and audio signals of nobj_dynamic pass-through objects and metadata and audio signals of (nobj_out−nobj_dynamic) new objects to the 3D Audio encoding unit 62.

Accordingly, in the example, the 3D Audio encoding unit 62 encodes and outputs metadata and audio signals of nobj_out objects in total.

In such a manner, the encoding device 51 reduces the total number of objects and performs encoding of the respective objects after the reduction. Therefore, it is possible to reduce the size (code amount) of the 3D Audio code string to be outputted and reduce the calculation amount and the memory amount in processing of encoding. Further, on the decoding side of the 3D Audio code string, the calculation amount and the memory amount can also be reduced in a 3D Audio decoding unit that performs decoding of the 3D Audio code string and in a succeeding rendering processing unit.

It is to be noted that the description here is directed to an example in which the pre-rendering processing unit 61 is arranged in the inside of the encoding device 51. However, this is not restrictive, and the pre-rendering processing unit 61 may be arranged outside the encoding device 51, that is, at a preceding stage to the encoding device 51, or may be arranged at the most preceding stage in the inside of the 3D Audio encoding unit 62.

Application Example 2 of Present Technology to Encoding Device

<Example of Configuration of Encoding Device>

Further, in the case where the present technology is applied to an encoding device, a pre-rendering process flag indicative of whether the object is a pass-through object or a newly generated object may also be included in a 3D Audio code string.

Figure 5:
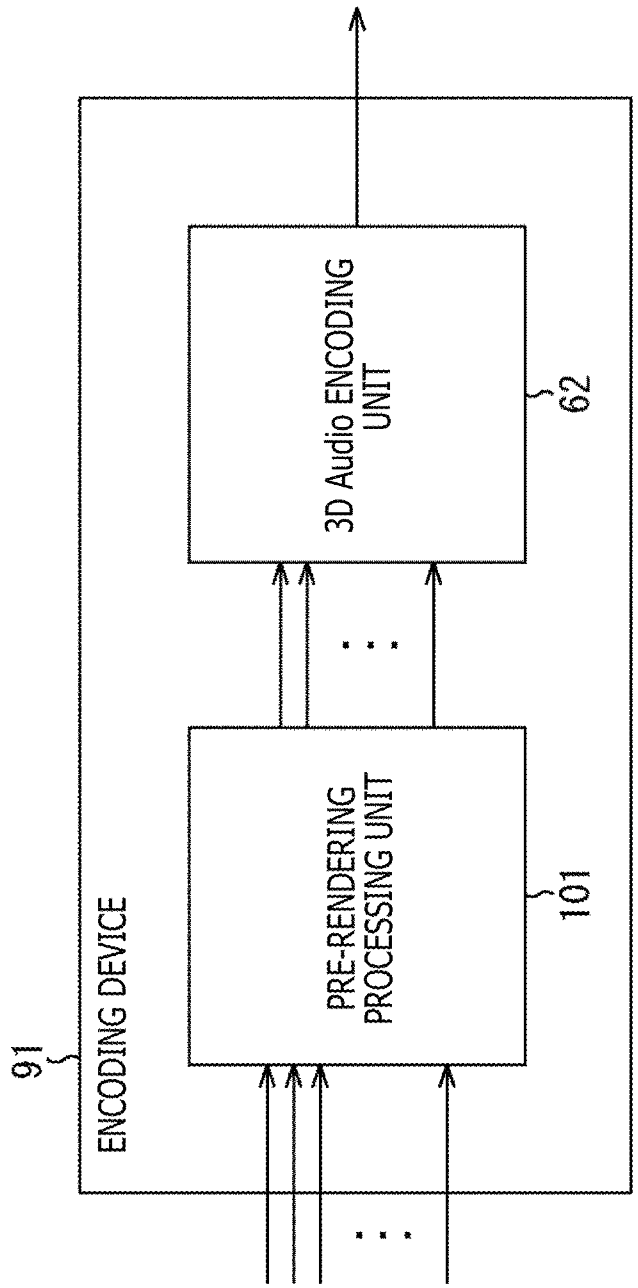
FIG. 5 is another view depicting an example of a configuration of an encoding device.

In such a case, the encoding device is configured, for example, in such a manner as depicted in FIG. 5. It is to be noted that, in FIG. 5, elements corresponding to those in the case of FIG. 4 are denoted by the same reference signs and that description thereof is suitably omitted.

An encoding device 91 depicted in FIG. 5 includes a pre-rendering processing unit 101 and a 3D Audio encoding unit 62.

The pre-rendering processing unit 101 corresponds to the pre-rendering processing device 11 depicted in FIG. 2 and has a configuration similar to that of the pre-rendering processing device 11. In particular, the pre-rendering processing unit 101 includes the priority calculation unit 21, pass-through object selection unit 22, and object generation unit 23 described hereinabove.

However, in the pre-rendering processing unit 101, the pass-through object selection unit 22 and the object generation unit 23 generate a pre-rendering process flag for each object and output metadata, an audio signal, and a pre-rendering process flag for each object.

The pre-rendering process flag is flag information indicative of whether the object is a pass-through object or a newly generated object, that is, whether or not the object is a pre-rendering processed object.

For example, in the case where the object is a pass-through object, the value of the pre-rendering process flag of the object is set to 0. In contrast, in the case where the object is a newly generated object, the value of the pre-rendering process flag of the object is set to 1.

Accordingly, for example, the pre-rendering processing unit 101 performs a process similar to the object outputting process described hereinabove with reference to FIG. 3 to reduce the total number of objects and generates a pre-rendering process flag of each of the objects after the total number of the objects is reduced.

Then, in regard to nobj_dynamic pass-through objects, the pre-rendering processing unit 101 supplies metadata, audio signals, and pre-rendering process flags having a value of 0 to the 3D Audio encoding unit 62.

In contrast, in regard to (nobj_out−nobj_dynamic) new objects, the pre-rendering processing unit 101 supplies metadata, audio signals, and pre-rendering process flags having a value of 1 to the 3D Audio encoding unit 62.

The 3D Audio encoding unit 62 encodes the metadata, audio signals, and pre-rendering process flags of the nobj_out objects in total that are supplied from the pre-rendering processing unit 101, and outputs a 3D Audio code string obtained as a result of the encoding.

<Example of Configuration of Decoding Device>

Figure 6:
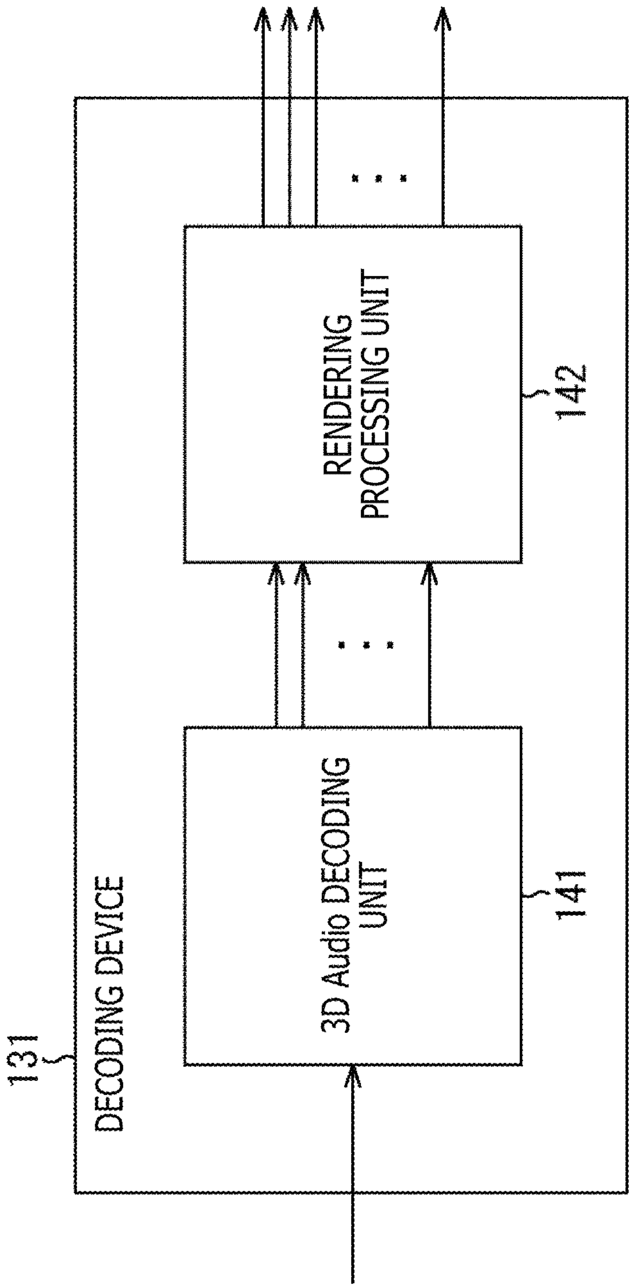
FIG. 6 is a view depicting an example of a configuration of a decoding device.

Further, a decoding device that receives, as an input thereto, a 3D Audio code string outputted from the encoding device 91 and including a pre-rendering process flag and performs decoding of the 3D Audio code string is configured, for example, in such a manner as depicted in FIG. 6.

A decoding device 131 depicted in FIG. 6 includes a 3D Audio decoding unit 141 and a rendering processing unit 142.

The 3D Audio decoding unit 141 acquires a 3D Audio code string outputted from the encoding device 91 by reception or the like, decodes the acquired 3D Audio code string, and supplies metadata, audio signals, and pre-rendering process flags of objects obtained as a result of the decoding, to the rendering processing unit 142.

On the basis of the metadata, audio signals, and pre-rendering process flags supplied from the 3D Audio decoding unit 141, the rendering processing unit 142 performs rendering processing to generate a speaker driving signal for each speaker to be used for reproduction of the content and outputs the generated speaker driving signals. The speaker driving signals are signals for driving the speakers to reproduce sound of the respective objects included in the content.

The decoding device 131 having such a configuration as described above can reduce the calculation amount and the memory amount of processing in the 3D Audio decoding unit 141 and the rendering processing unit 142 by using the pre-rendering process flag. In particular, in the present example, the calculation amount and the memory amount upon decoding can be reduced further in comparison with those in the case of the encoding device 51 depicted in FIG. 4.

Here, a particular example of use of the pre-rendering process flag in the 3D Audio decoding unit 141 and the rendering processing unit 142 is described.

First, an example of use of the pre-rendering process flag in the 3D Audio decoding unit 141 is described.

The 3D Audio code string includes metadata, an audio signal, and a pre-rendering process flag of an object. As described hereinabove, the metadata includes priority information and so forth. However, in some cases, the metadata may not include the priority information. The priority information here is priority information priority_raw[ifrm][iobj] described hereinabove.

The pre-rendering process flag has a value set on the basis of the priority information priority[ifrm][iobj] calculated by the pre-rendering processing unit 101 which is the preceding stage to the 3D Audio encoding unit 62. Therefore, it can be considered that, for example, a pass-through object whose pre-rendering process flag has a value of 0 is an object having a high priority degree and that a newly generated object whose pre-rendering process flag has a value of 1 is an object having a low priority degree.

Therefore, in the case where the metadata does not include priority information, the 3D Audio decoding unit 141 can use the pre-rendering process flag in place of the priority information.

In particular, it is assumed, for example, that the 3D Audio decoding unit 141 decodes only objects having a high priority degree.

At this time, in the case where the value of the pre-rendering process flag of an object is 1, the 3D Audio decoding unit 141 determines that the value of the priority information of the object is 0, and does not perform, in regard to the object, decoding of an audio signal and so forth included in the 3D Audio code string.

On the other hand, in the case where the value of the pre-rendering process flag of an object is 0, the 3D Audio decoding unit 141 determines that the value of the priority information of the object is 1, and performs, in regard to the object, decoding of metadata and an audio signal included in the 3D Audio code string.

By this, the calculation amount and the memory amount in decoding can be reduced by the amount that is not required for the object for which the decoding processing is omitted. It is to be noted that the pre-rendering processing unit 101 of the encoding device 91 may generate priority information of metadata on the basis of the pre-rendering process flag, that is, on a selection result of a non-pass-through object.

Next, an example of use of the pre-rendering process flag in the rendering processing unit 142 is described.

The rendering processing unit 142 performs spread processing on the basis of spread information included in metadata, in some cases.

Here, the spread processing is processing of spreading a sound image of sound of an object on the basis of the value of spread information included in metadata of each object and is used to increase the immersive of sound.

On the other hand, an object whose pre-rendering process flag has a value of 1 is an object generated newly by the pre-rendering processing unit 101 of the encoding device 91, that is, an object in which multiple objects determined as non-pass-through objects are mixed. Then, the value of spread information of such a newly generated object is one value obtained from, for example, an average value of spread information of multiple non-pass-through objects.

Therefore, if the spread processing is performed on an object whose pre-rendering process flag has a value of 1, this means that the spread processing is performed on the object that is originally a plurality of objects, on the basis of a single piece of spread information that is not necessarily appropriate, resulting in possible degradation of the immersive of sound.

Therefore, the rendering processing unit 142 can be configured so as to perform the spread processing based on spread information on an object whose pre-rendering process flag has a value of 0, but so as not to perform the spread processing on an object whose pre-rendering process flag has a value of 1. It is thus possible to prevent degradation of the immersive of sound, and since unnecessary spread processing is not performed, it is also possible to reduce the calculation amount and the memory amount by the amount that is not required for the unnecessary processing.

The pre-rendering processing device to which the present technology is applied may otherwise be provided in a device that performs reproduction or editing of content including a plurality of objects, a device on the decoding side, or the like. For example, in an application program that edits a track corresponding to an object, since an excessively great number of tracks complicate editing, it is effective if the present technology which can reduce the number of tracks upon editing, that is, the number of objects, is applied.

<Example of Configuration of Computer>

Incidentally, while the series of processes described above can be executed by hardware, it can otherwise be executed by software. In the case where the series of processes is executed by software, a program included in the software is installed into a computer. The computer here includes a computer incorporated in dedicated hardware or, for example, a general-purpose personal computer that can execute various functions by installing various programs thereinto.

Figure 7:
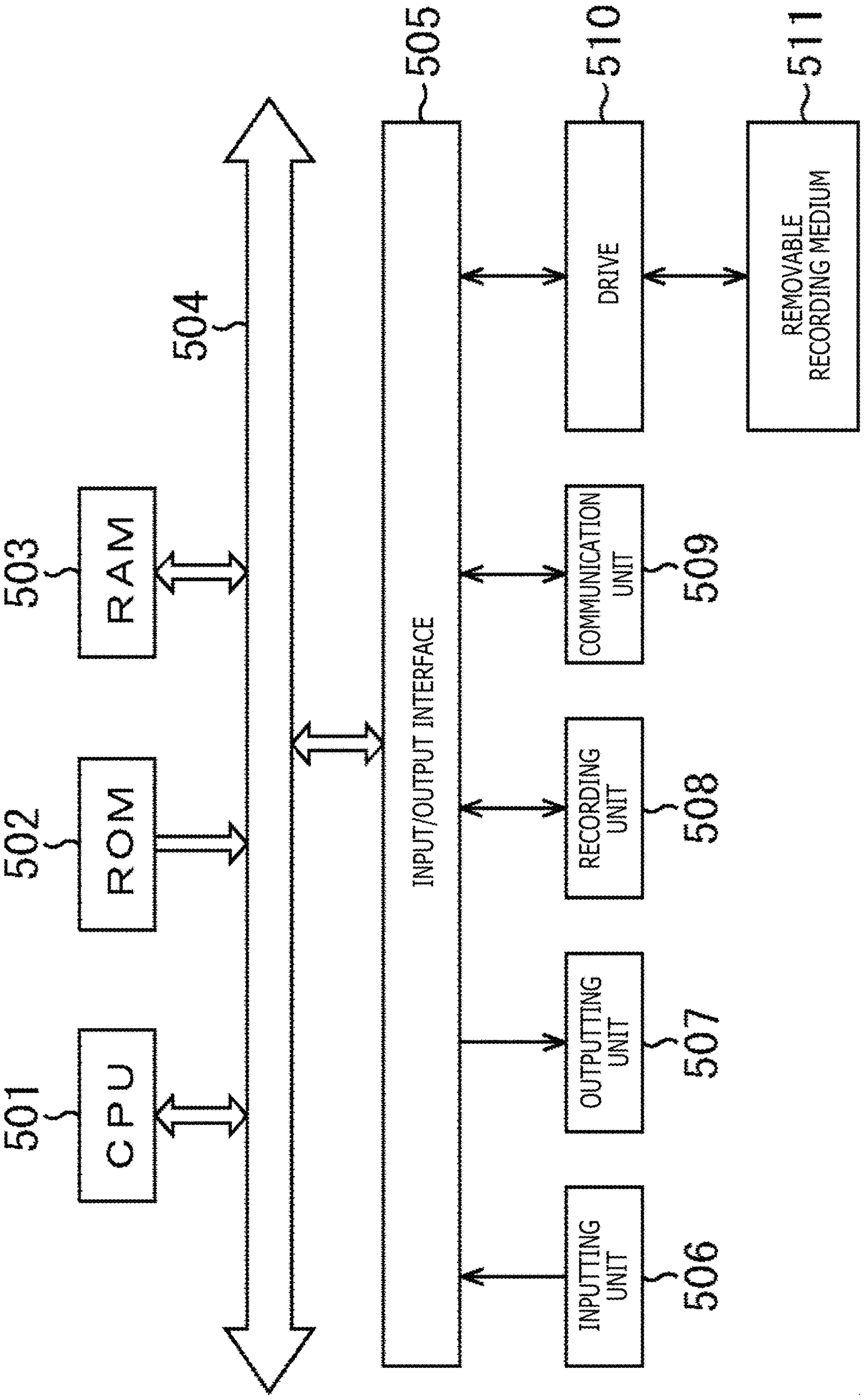
FIG. 7 is a view depicting an example of a configuration of a computer.

FIG. 7 is a block diagram depicting an example of a hardware configuration of a computer that executes the series of processes described hereinabove according to a program.

In the computer, a CPU (Central Processing Unit) 501, a ROM (Read Only Memory) 502, and a RAM (Random Access Memory) 503 are connected to one another by a bus 504.

Further, an input/output interface 505 is connected to the bus 504. An inputting unit 506, an outputting unit 507, a recording unit 508, a communication unit 509, and a drive 510 are connected to the input/output interface 505.

The inputting unit 506 includes, for example, a keyboard, a mouse, a microphone, an imaging device, and so forth. The outputting unit 507 includes a display, a speaker, and so forth. The recording unit 508 includes, for example, a hard disk, a nonvolatile memory, or the like. The communication unit 509 includes, for example, a network interface or the like. The drive 510 drives a removable recording medium 511 such as a magnetic disk, an optical disk, a magneto-optical disk, or a semiconductor memory.

In the computer configured in such a manner as described above, the CPU 501 loads a program recorded, for example, in the recording unit 508 into the RAM 503 through the input/output interface 505 and the bus 504 and executes the program to perform the series of processes described above.

The program to be executed by the computer (CPU 501) can be recorded on the removable recording medium 511 as a package medium or the like and be provided, for example. Further, it is possible to provide the program through a wired or wireless transmission medium such as a local area network, the Internet, or a digital satellite broadcast.

In the computer, the program can be installed into the recording unit 508 through the input/output interface 505 by mounting the removable recording medium 511 on the drive 510. As an alternative, the program can be received through a wired or wireless transmission medium by the communication unit 509 and installed into the recording unit 508. As another alternative, the program can be installed in advance in the ROM 502 or the recording unit 508.

It is to be noted that the program to be executed by the computer may be a program by which processes are carried out in a time series in the order as described in the present specification, or may be a program by which processes are executed in parallel or at necessary timings such as when the processes are called.

Further, embodiments of the present technology are not limited to the embodiments described hereinabove and allow various alterations without departing from the subject matter of the present technology.

For example, the present technology can take a configuration of cloud computing by which one function is shared and cooperatively processed by a plurality of apparatuses through a network.

Further, each of the steps described hereinabove with reference to the flow chart can be executed by a single apparatus or can be shared and executed by a plurality of apparatuses.

In addition, in the case where a plurality of processes is included in one step, the plurality of processes included in the one step may be executed by one apparatus or may be shared and executed by a plurality of apparatuses.

Further, the present technology can also take such a configuration as described below.

(1)

An information processing device including:

a pass-through object selection unit configured to acquire data of L objects and select, from the L objects, M pass-through objects whose data is to be outputted as it is; and an object generation unit configured to generate, on the basis of the data of multiple non-pass-through objects that are not the pass-through objects among the L objects, the data of N new objects, N being smaller than (L−M).

(2)

The information processing device according to (1), in which the object generation unit generates the data of the new objects on the basis of the data of the (L−M) non-pass-through objects.

(3)

The information processing device according to (1) or (2), in which the object generation unit generates, on the basis of the data of the multiple non-pass-through objects, the data of the N new objects to be arranged at positions different from one another, by rendering processing.

(4)

The information processing device according to (3), in which the object generation unit determines the positions of the N new objects on the basis of position information included in the data of the multiple non-pass-through objects.

(5)

The information processing device according to (4), in which the object generation unit determines the positions of the N new objects by a k-means method on the basis of the position information.

(6)

The information processing device according to (3), in which the positions of the N new objects are determined in advance.

(7)

The information processing device according to any one of (3) to (6), in which the data includes object signals and metadata of the objects.

(8)

The information processing device according to (7), in which the objects include audio objects.

(9)

The information processing device according to (8), in which the object generation unit performs VBAP as the rendering processing.

(10)

The information processing device according to any one of (1) to (9), in which the pass-through object selection unit selects the M pass-through objects on the basis of priority information of the L objects.

(11)

The information processing device according to any one of (1) to (9), in which the pass-through object selection unit selects the M pass-through objects on the basis of a degree of concentration of the L objects in a space.

(12)

The information processing device according to any one of (1) to (11), in which

M that represents the number of the pass-through objects is designated.

(13)

The information processing device according to any one of (1) to (11), in which the pass-through object selection unit determines M that represents the number of the pass-through objects, on the basis of a total data size of the data of the pass-through objects and the data of the new objects.

(14)

The information processing device according to any one of (1) to (11), in which the pass-through object selection unit determines M that represents the number of the pass-through objects, on the basis of a calculation amount of processing upon decoding of the data of the pass-through objects and the data of the new objects.

(15)

An information processing method by an information processing device, including:

acquiring data of L objects;

selecting, from the L objects, M pass-through objects whose data is to be outputted as it is; and generating, on the basis of the data of multiple non-pass-through objects that are not the pass-through objects among the L objects, the data of N new objects, N being smaller than (L−M).

(16)

A program causing a computer to execute the steps of:

acquiring data of L objects;

selecting, from the L objects, M pass-through objects whose data is to be outputted as it is; and generating, on the basis of the data of multiple non-pass-through objects that are not the pass-through objects among the L objects, the data of N new objects, N being smaller than (L−M).

REFERENCE SIGNS LIST

11: Pre-rendering processing device

21: Priority calculation unit

22: Pass-through object selection unit

23: Object generation unit

The invention claimed is:

1. An information processing device comprising:

a pre-rendering processing device configured to acquire data of a plurality of objects, the data comprising a plurality of object signals and corresponding metadata, calculate priority information for one or more of the plurality of objects comprising:

setting the priority information based on a first audio signal in a current time frame and a second audio signal in a previous time frame; and output additional data comprising the calculated priority information.

2. The information processing device of claim 1 wherein the data further comprises gain information, position information, priority information and spread information.

3. The information processing device of claim 1 wherein the pre-rendering processing device comprises a priority calculation circuit configured to calculate the priority information based on the data, and output the additional data to a succeeding stage.

4. The information processing device of claim 3 wherein the pre-rendering processing device is configured to calculate the priority information based on the plurality of object signals and the corresponding metadata.

5. The information processing device of claim 4 wherein the pre-rendering processing device further comprises:

an object generation circuit;

a pass-through object selection circuit configured to select a plurality of pass-through objects based on the data and the priority information, output data associated with the pass-through objects supplied from the priority calculation circuit to the succeeding stage, and supply the metadata and audio signals associated with a plurality of non-pass-through objects supplied from the priority calculation circuit to the object generation circuit.

6. The information processing device of claim 5 wherein the object generation circuit is configured to generate additional metadata and additional audio signals of a previously presented object based on the metadata and the audio signals associated with the plurality of non-pass-through objects supplied from the priority calculation circuit to the object generation circuit, and output the additional metadata and additional audio signal of the previously presented object to the succeeding stage.

7. The information processing device of claim 6 further comprising:

an encoding circuit configured to encode the metadata, the additional metadata, the audio signals, and the additional audio signals to generate a code string, and output the code string.

8. The information processing device of claim 7 further comprising:

a decoding circuit configured to receive the code string output by the encoding circuit.

9. An information processing method by an information processing device, comprising:

acquiring data of a plurality of objects, the data comprising a plurality of object signals and corresponding metadata;

calculating priority information for one or more of the plurality of objects comprising:

setting the priority information based on a first audio signal in a current time frame and a second audio signal in a previous time frame; and outputting additional data comprising the calculated priority information.

10. The information processing method by an information processing device of claim 9 wherein the data further comprises gain information, position information, priority information and spread information.

11. The information processing method by the information processing device of claim 10 further comprising:

calculating the priority information based on the data, and outputting the additional data to a succeeding stage.

12. The information processing method by the information processing device of claim 11 further comprising:

calculating the priority information based on the plurality of object signals and the corresponding metadata.

13. The information processing method by the information processing device of claim 12 further comprising:

selecting a plurality of pass-through objects based on the data and the priority information, outputting data associated with the pass-through objects to the succeeding stage, and supplying the metadata and audio signals associated with a plurality of non-pass-through objects supplied.

14. A program stored on a non-transient computer readable medium that when executed, causes a computer to execute the steps of:

acquiring data of a plurality of objects, the data comprising a plurality of object signals and corresponding metadata;

calculating priority information for one or more of the plurality of objects comprising:

setting the priority information based on a first audio signal in a current time frame and a second audio signal in a previous time frame; and outputting additional data comprising the calculated priority information.

15. The program stored on a non-transient computer readable medium of claim 14 wherein the data further comprises gain information, position information, priority information and spread information.

16. The program stored on a non-transited computer readable medium of claim 15 that when executed, causes the computer to execute the additional steps of:

calculating the priority information based on the data, and outputting the additional data to a succeeding stage.

17. The program stored on a non-transient computer readable medium of claim 16 that when executed, causes the computer to execute the additional step of:

calculating the priority information based on the plurality of object signals and the corresponding metadata.

18. The program stored on a non-transient computer readable medium of claim 17 that when executed, causes the computer to execute the additional steps of:

selecting a plurality of pass-through objects based on the data and the priority information, outputting data associated with the pass-through objects to the succeeding stage, and supplying the metadata and audio signals associated with a plurality of non-pass-through objects supplied.

* * * * *